United States Patent [19]

Riensche

[11] Patent Number: 5,309,935
[45] Date of Patent: May 10, 1994

[54] DEVICE FOR CONVERTING AN ELECTRIC CURRENT SIGNAL INTO A MECHANICAL CORRECTING VARIABLE

[75] Inventor: Heinrich Riensche, Bückeburg, Fed. Rep. of Germany

[73] Assignee: Sensycon Gesellschaft für Industrielle Sensorsysteme und Processleittechnik mbH, Hanover, Fed. Rep. of Germany

[21] Appl. No.: 959,737

[22] Filed: Oct. 13, 1992

[30] Foreign Application Priority Data

Dec. 20, 1991 [DE] Fed. Rep. of Germany ....... 4142269

[51] Int. Cl.$^5$ .............................................. F15B 13/16
[52] U.S. Cl. ......................................... 137/85; 91/387
[58] Field of Search .......................... 91/385, 386, 387; 137/85, 86

[56] References Cited

U.S. PATENT DOCUMENTS

| | | | |
|---|---|---|---|
| 2,942,581 | 6/1960 | Gaffney | 91/387 X |
| 3,401,603 | 9/1968 | Coakley | 91/387 |
| 3,503,303 | 3/1970 | Domyan | 91/387 X |
| 4,343,224 | 8/1982 | Kemmler | 91/387 X |
| 4,628,793 | 12/1986 | Roth | 91/387 X |

FOREIGN PATENT DOCUMENTS 2264220 12/1976 Fed. Rep. of Germany.

Primary Examiner—Robert G. Nilson
Attorney, Agent, or Firm—Martin A. Farber

[57] ABSTRACT

A device for converting an electric current signal into a mechanical correcting variable, includes a pneumatic correcting element (1) with slide rod (2), a pneumatic amplifier (3), a compressed-air supply (4) and an electropneumatic signal converter which has a solenoid (5) with coil, iron circuit and air gap, a nozzle/baffle-plate device (6), and a lever (8) which is swingably mounted on a tensioning band (7). One end of the tensioning band (7) is mounted for turning around its longitudinal axis and, perpendicular to the longitudinal axis there is arranged a feedback lever (12) one end of which is attached, fixed in rotation, to the turnable end of the fastening belt (7) while its free end is coupled to the slide rod (2) of the pneumatic correcting element (1).

2 Claims, 2 Drawing Sheets

DEVICE FOR CONVERTING AN ELECTRIC CURRENT SIGNAL INTO A MECHANICAL CORRECTING VARIABLE

FIELD AND BACKGROUND OF THE INVENTION

The present invention refers to a device for converting an electric current signal into a mechanical correcting variable, the device consisting essentially of a pneumatic correcting element with slide rod, a pneumatic amplifier, a compressed-air supply, and an electromagnetic signal converter which has a solenoid with coil, iron circuit and air gap, a nozzle/baffle-plate device and a lever which is mounted for swinging on a tensioning band. The lever bears the baffle plate on its one end and a permanent magnet arranged opposite the air gap of the solenoid on its other end. A distance between baffle plate and nozzle is variable in proportion to current flowing as input signal through the solenoid, and the correspondingly changed dynamic pressure in the nozzle are used, after pneumatic amplification, directly to control the pneumatic correcting element. A feedback of the mechanical correcting variable into the electropneumatic signal converter is provided.

For the same purpose of use, an electropneumatic signal converter having an electric measuring instrument and a pneumatic lagging device is known from Federal Republic of Germany AS 22 64 220, in which the coupling of the lagging device with the measuring instrument is effected via a nozzle/baffle-plate device. The correcting elements which bear the nozzle and the baffle plate are mounted in cross-spring joints, the axes or swing of which are parallel to each other and lie in the same plane. The known device operates in accordance with the path comparison principle. The stroke of the solenoid is converted into a movement of the baffle plate and the nozzle follows along in this movement by readjustment of the pressure.

One substantial disadvantage of this device is that the paths of a few tenths of a millimeter which can be obtained in the region of the nozzle must be compared with the path of the mechanical correcting variable, which lies within the range of 10 to 100 mm. Thus, a leverage of 1:100 to 1:1000 is necessary, which can be obtained only with very long levers or with an expensive mechanical transmission. In this way the apparatus becomes relatively large and expensive and its adjustment is very difficult. In addition, there is the fact that with such a leverage, considerable hysteresis errors are unavoidable, they being far above the value of 0.5% which is demanded today. Finally, in the known device relatively large masses must be moved so that the instrument is very sensitive to vibration and therefore scarcely enters into consideration for direct attachment to, for instance, process valves.

SUMMARY OF THE INVENTION

It is an object of the invention so further to develop a device of the aforementioned type which overcomes the disadvantages described above. In particular, the masses moved should be kept as small as possible in order to be able to obtain a resistance to vibration of up to about 10 g within the frequency range of up to 80 Hz and a hysteresis error of less than 1%. Moved masses of less than 1 g are desired.

According to the invention, the above-described type of device is developed in the manner that one end of the tensioning band (7) is mounted for pivoting around its longitudinal axis and that, perpendicular to the longitudinal axis, there is arranged a feedback lever (12). One end of the feedback lever is attached, fixed in rotation, to the rotatable end of the tensioning band (7) while its free end is coupled to the slide rod (2) of the pneumatic correcting element.

As a further development of the invention, the free end of the feedback lever (12) is urged by means of a spring (20) against a cam plate (15) which is rigidly fastened to a slide rod (2), and that the free end of the feedback lever (12) rests via a guide roller (16) on the cam (15).

The device of the invention operates in accordance with the force comparison principle. The position of the slide rod is copied via the feedback lever directly on the baffle plate, the tensioning band present being used as elastically deformable element. By a suitable design of the spring constant, large paths of the correcting element can be converted into very small strokes of the baffle plate. In the electromagnetic signal converter (for instance, according to Federal Republic of Germany Patent 32 05 576), only the tensioning band need be mounted on one end rotatable about its axis and be developed for the attaching, fixed in rotation, of a lever. No additionally moved masses are required, so that by the feeding back of the mechanical correcting variable, the excellent properties of the electropneumatic signal converter with respect to freedom from vibration and hysteresis error are not impaired. Since the mass moved is far less than one gram, a resistance to vibration of 5 g and a hysteresis error of less than 0.5% are readily obtained at 80 Hz.

BRIEF DESCRIPTION OF THE DRAWINGS

With the above and other objects and advantages in view, the present invention will become more clearly understood in connection with the detailed description of preferred embodiments, when considered with the accompanying drawing, of which.

DETAILED DESCRIPTION OF THE PREFERRED EMBODIMENTS

Figure 1:
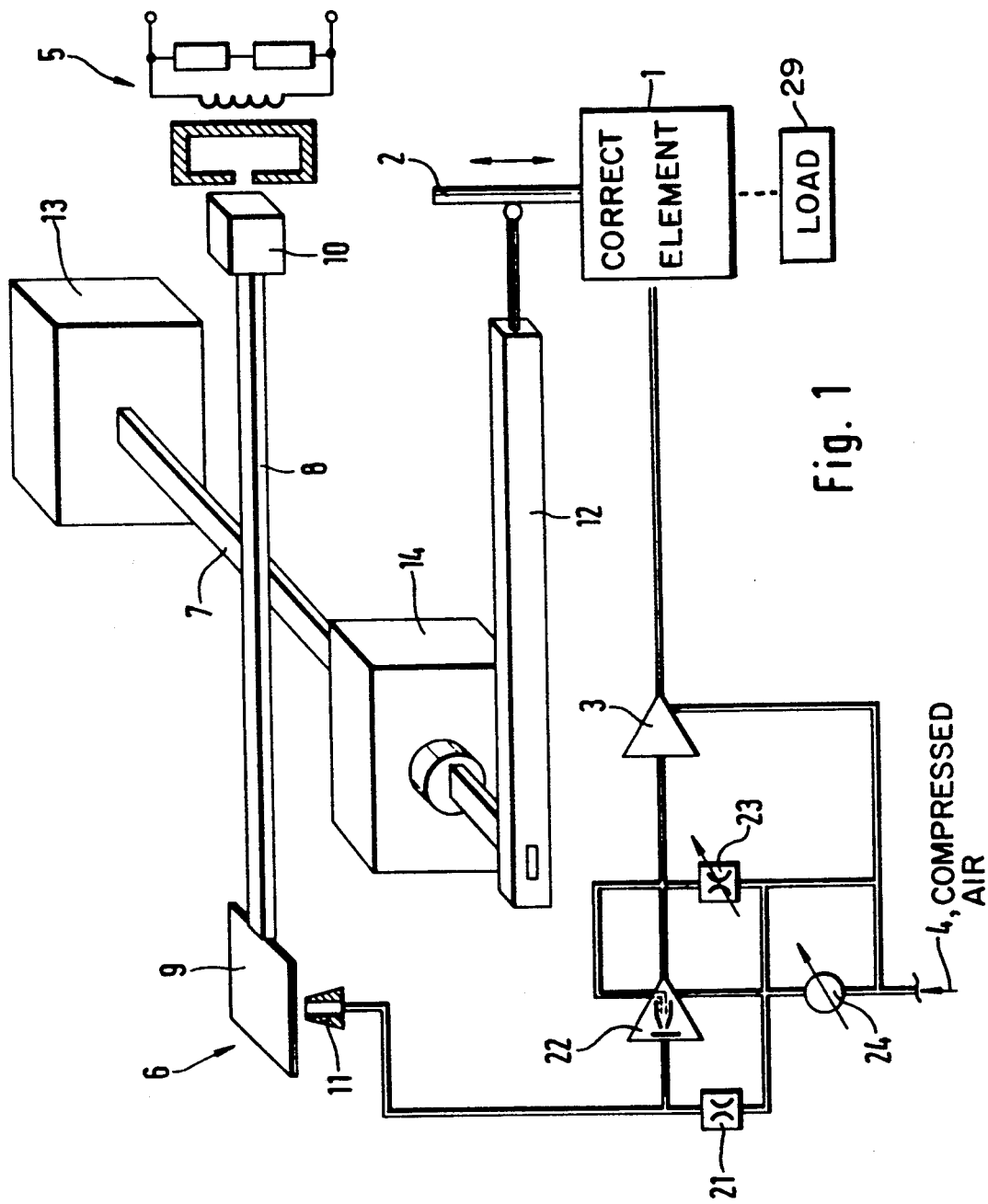
FIG. 1 shows, simplified, a device in accordance with a first embodiment of the invention.

FIG. 1 shows an apparatus according to the invention, partially in perspective and partially greatly simplified. The pneumatic correcting element 1 has a slide rod 2 to which a feedback lever 12 is coupled. The feedback lever 12 is fixedly attached to a first end of a tensioning band 7. A second end of the tensioning band 7 is secured fixedly to a clamping block 13, while the opposite end of the tensioning band 7, adjacent the feedback lever 12, is supported for rotation at a second (front) clamping block 14. This permits the feedback lever 12 to rotate or pivot about a longitudinal axis of the band 7 in concert with a twisting movement of the band 7. The band 7 acts as a torsion spring. A lever 8 carries a baffle plate 9 and a permanent magnet 10 and is located on the tensioning band 7 and fixedly secured to the band 7. The permanent magnet 10 faces the air gap of a solenoid 5 with coil and iron magnetic flux circuit, while the baffle plate 9, together with a nozzle 11, forms a nozzle/baffle-plate device 6. The clamping blocks for the tensioning band 7, in practice, comprise parts of a housing or the like.

The apparatus furthermore includes a pneumatic amplifier 3, a compressed-air supply 4, a throttle 21, a medium-pressure amplifier 22 with adjustable pressure-reducing throttle 23, and a pressure regulator 24. Within the solenoid 5, a magnetic flux which is proportional to the input variable (the current signal) is produced to accomplish a change in position of the permanent magnet 10 on which the tensioning band 7 acts as restoring spring. Movement of the magnet 10 introduces a pivoting of the lever 8. The pivoting of the lever 8 around the axis of the tensioning band results in a change in the distance between baffle plate 9 and nozzle 11 and a change, proportional to this, in the dynamic air pressure in the nozzle 11.

In this way, a variable pneumatic signal is produced at an input of the medium pressure amplifier 22, with a corresponding amplified pneumatic signal appearing at the output of the medium-pressure amplifier 22. The signal from the amplifier 22 is further amplified to such an extent in the amplifier 3 that the signal can be used directly to control the pneumatic correcting element 1. The latter, on its part, produces a mechanical correcting variable by which a flap, valve, other output load such as load 29 can be displaced. A reduction in the dynamic air pressure at the nozzle 11 causes a displacement of the load 29 in one direction while an increase in the dynamic air pressure at the nozzle 11 causes a displacement of the load 29 in a second direction opposite the first direction.

The control circuit is closed via the feedback lever 12, the latter being pivoted b a movement of the slide rod 2. The pivoting of the lever 12 provides that a comparison of forces is made in the tensioning band 7 between the actual position of the correcting element 1 and the position determined by the electric current signal at the magnet 10.

Figure 2:
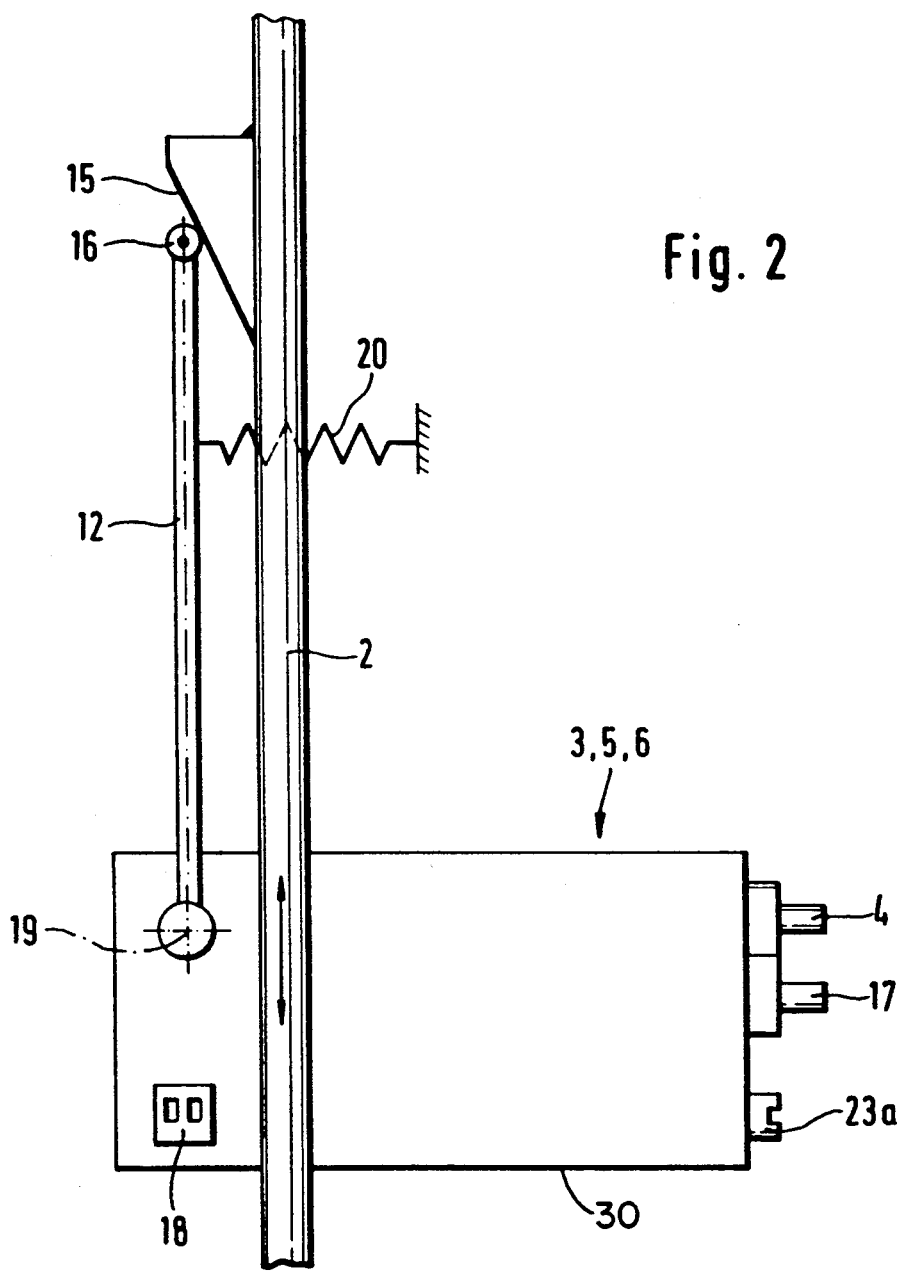
FIG. 2 shows details of a device according to a further embodiment of the invention.

FIG. 2 shows a further embodiment for the coupling of the feedback lever 12 to the slide rod 2. Here, a cam 15 is rigidly connected to the slide rod 2, while the feedback lever 12 is attached, fixed in rotation, to the tensioning band 7 (shown in FIG. 1) one end of which is mounted for turning around the axis 19. The feedback lever 12 is urged by a spring 20 against the cam 15 and rests on it via the guide roller 16. Solenoid 5, nozzle/baffle-plate device 6 and amplifier 3 are arranged in a housing 30 on which a compressed-air supply 4, an output 17 for a pneumatic signal, and an input 18 for a control signal are arranged. Furthermore, an adjustment screw 23a for the adjustable throttle 23 is provided on the housing. Via the cam 15, the upward and downward movement of the slide rod 2 is converted into a swinging movement of the feedback lever 12, which results in a twisting of the tensioning band 7 and thus obtaining an actual/desired comparison of the forces.

I claim:

1. A device for converting an electric current signal into a mechanical correcting variable, comprising
   a pneumatic correcting element with slide rod, a feedback lever mechanically coupled to said slide rod, a pneumatic amplifier for driving said correcting element, and a compressed-air supply for operating said pneumatic amplifier;
   an electromagnetic signal converter which includes a permanent magnet, a solenoid with coil, and an iron magnetic flux circuit with air gap;
   a tensioning band, a nozzle/baffle-plate device, and a support lever which is mounted fixedly to said tensioning band for pivoting about a longitudinal axis of said band during a twisting of said band, said support lever bearing said baffle plate on a first end of said support lever and said permanent magnet on a second end of said support lever facing the air gap of said solenoid;
   a pneumatic circuit interconnecting said correcting element with said amplifier and said compressed-air supply and said nozzle;
   wherein a distance between baffle plate and nozzle of said nozzle/baffle-plate device is variable by a pivoting of said support lever in proportion to current flowing as input signal through said solenoid;
   a change in dynamic air pressure in the nozzle is amplified by said pneumatic amplifier and applied via said pneumatic circuit to control said pneumatic correcting element;
   one end of said tensioning band is fixedly mounted to allow for a pivoting of a second end of said tensioning band around its longitudinal axis;
   said feedback lever is mounted fixedly to said tensioning band and spaced apart along said tensioning band from said support lever, said feed back lever extending perpendicular to the longitudinal axis of said tensioning band to be pivoted about the longitudinal axis by said slide rod upon displacement of said slide rod to communicate from said correcting element a feedback of the mechanical correcting variable via said tensioning band and said support lever into an electropneumatic signal;
   a mechanical coupling between said feedback lever and said slide rod provides for reduction in a ratio of movement of said slide rod to movement of said baffle plate while minimizing mass of said feedback lever;
   said mechanical coupling between said feedback lever and said slide rod comprises a spring coupled to said feedback lever, and a cam plate disposed on said slide rod; and
   a free end of said feedback lever is urged by means of said spring against said cam plate.

2. A device according to claim 1,
   wherein said mechanical coupling between said feedback lever and said slide rod comprises further a guide roller disposed on the free end of said feedback lever; and
   wherein the free end of said feedback lever rests via said guide roller on said cam.

* * * * *